May 16, 1939.　　　A. BEACHER　　　2,158,891
PARKING MECHANISM FOR AUTOMOBILES
Filed May 12, 1938　　　3 Sheets-Sheet 2
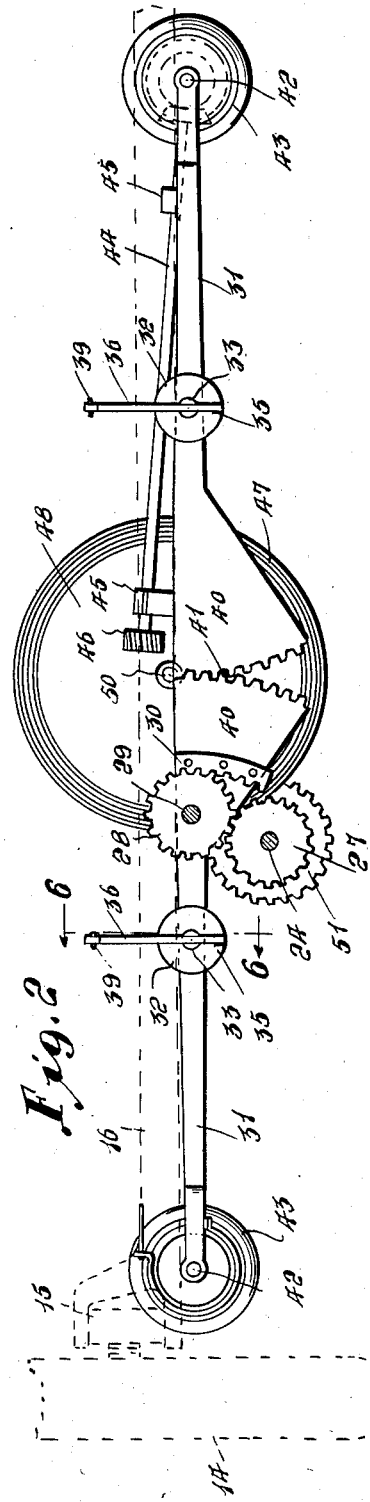
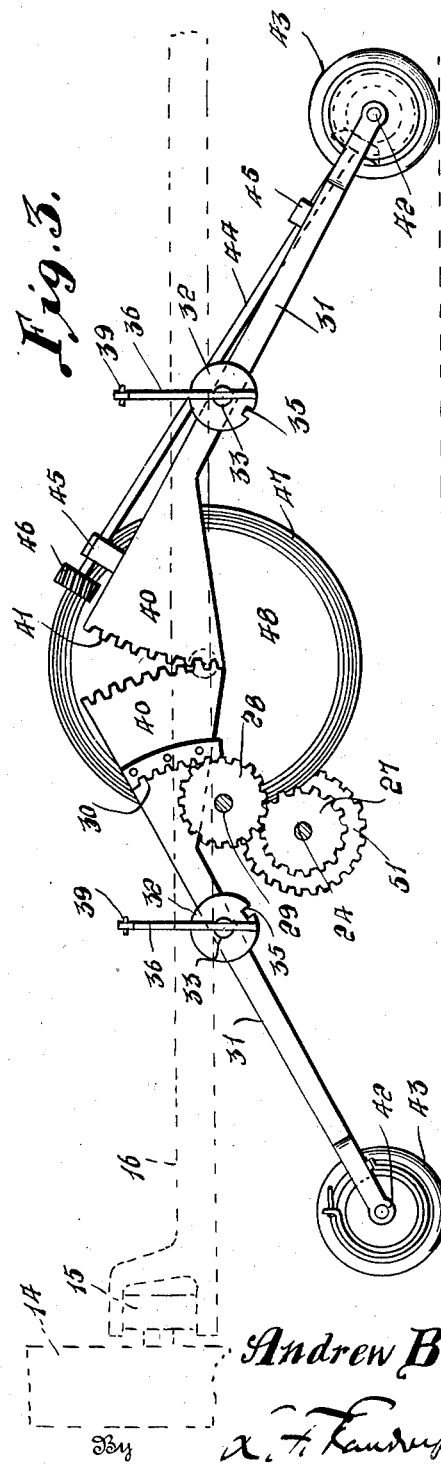
Inventor
Andrew Beacher May 16, 1939.  A. BEACHER  2,158,891
PARKING MECHANISM FOR AUTOMOBILES
Filed May 12, 1938  3 Sheets-Sheet 3
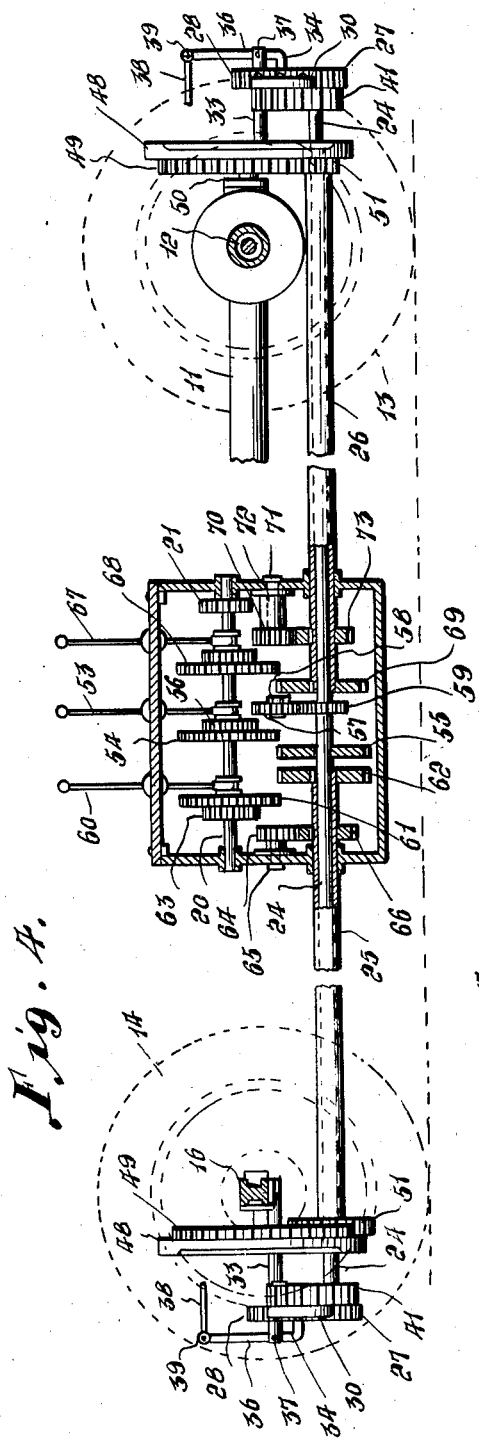
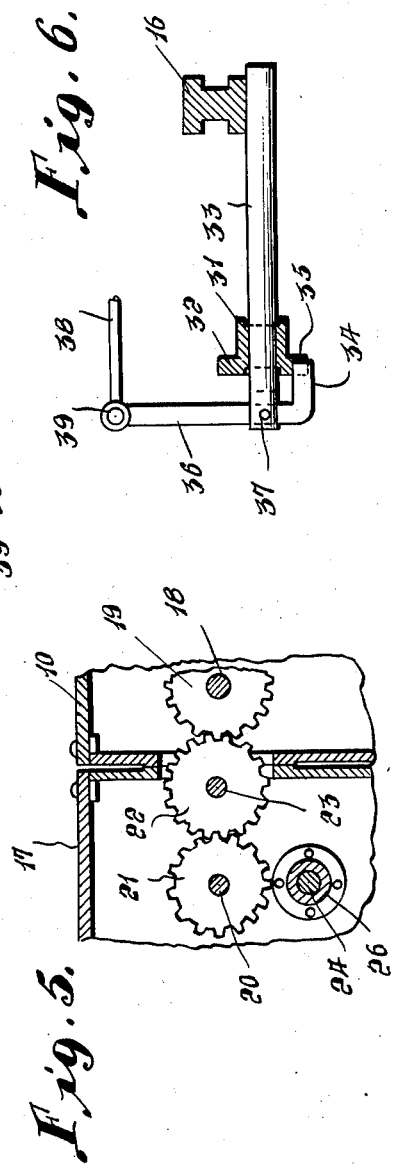
Inventor
Andrew Beacher Patented May 16, 1939

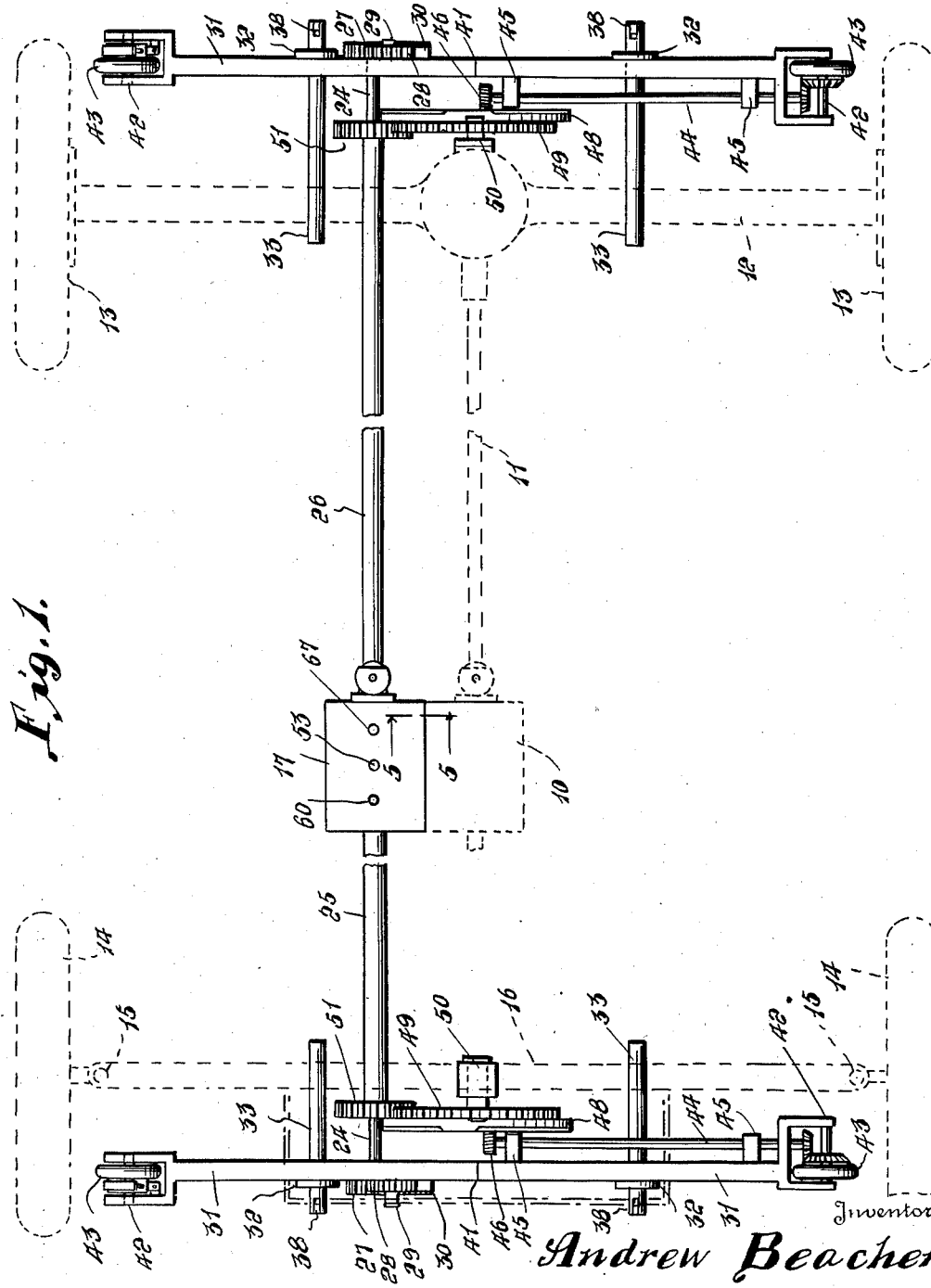

2,158,891

UNITED STATES PATENT OFFICE 2,158,891

PARKING MECHANISM FOR AUTOMOBILES

Andrew Beacher, Lexington, Ill.

Application May 12, 1938, Serial No. 207,635

3 Claims. (Cl. 180—1)

This invention relates to mechanism in the nature of an attachment or addition to automobiles to facilitate the parking thereof or manipulation within minimum space, it being generally an aim to provide a structure which is simple, has few parts and is capable of manufacture at minimum cost.

More specifically, it is aimed to provide a device which may be elevated from the power of the automobile, with means operable at either the front or rear to positively maneuver the automobile.

The more specific objects and advantages will become apparent from a consideration of the description following taken in connection with accompanying drawings illustrating an operative embodiment.

In said drawings:—

Figure 1 is a view in plan illustrating my improvements in connection with fragments of an automobile, the latter being shown in dot-dash lines;

Figure 2 is a left end elevation of the parts of Figure 1;

Figure 3 is a view similar to Figure 1 but showing the parts in elevated position;

Figure 4 is a substantially central, longitudinal sectional view, partly broken away;

Figure 5 is a detail section taken on the line 5—5 of Figure 1, and

Figure 6 is a detail section taken on the plane of line 6—6 of Figure 2.

Referring specifically to the drawings wherein like reference characters designate like or similar parts, parts of an automobile are fragmentarily shown in Figure 1 in dot-dash lines, in which a transmission case and mechanism driven by the engine, under the usual control, is suggested at 10 and through the usual propeller shaft 11, drives the rear axle mechanism 12 and which in turn drives the rear wheels 13. The steering wheels or front wheels are shown at 14, pivoted on vertical axes as usual as at 15 from a cross beam or axle member 16.

In accordance with my invention, the transmission case 10 is enlarged or provided with an additional case 17 which may be secured in any suitable way to the case 10. From one of the driven shafts such as 18, within the transmission mechanism 10, as through a gear 19, keyed thereto, a countershaft 20 is driven, such countershaft being journaled in the casing 17, longitudinally thereof and it has keyed thereto a gear 21, enmeshed with an intermediate gear 22, keyed to a shaft 23 journaled in casing 17, and which intermediate gear 22 is enmeshed with the gear wheel 19.

Journaled longitudinally of the casing 17 is a shaft 24 extending to the front and rear of the automobile and journaled in front and rear tubular shaft sections 25 and 26, suitably journaled in the housing 17 and journaled and supported otherwise as desired from the automobile.

At each end, shaft 24 has a gear wheel 27 keyed thereto which are enmeshed with gear wheels 28 journaled on suitably mounted rigid shafts 29, which are enmeshed with gear segments 30 of automobile lifting levers 31.

Said levers 31 are employed in pairs both at the front and rear of the automobile and normally are elevated or retracted so as not to interfere with manipulation of the automobile and as best seen in Figure 2. However, incidental to parking or maneuvering within small spaces, the levers 31 are adapted to be disposed in the position shown in Figure 3, wherein the automobile is lifted.

Said levers 31 have hubs 32 journaled on stub shafts 33, welded or otherwise rigidly secured to adjacent structure such as the axle 16 and the casing of the rear axle 12. Such levers 31 are normally held in horizontal position through the engagement of lugs 34 in notches 35 of the hubs 32. Such lugs 34 are portions of latches 36 pivoted at 37 to the outer ends of the shafts 33 and which are in turn operated by rods 38 pivoted at 39 to the latches. The latches normally hold the levers elevated and must be released before a lifting operation, it being clear that any suitable mechanism may be employed for maintaining the latches 36 in the latched position and for releasing them simultaneously preparatory to lifting.

Each pair of levers 31 at the inner end is widened as at 40 and provided with enmeshed segmental gear teeth 41. At the other ends, each lever 31 has a shaft or axle 42, preferably rigidly secured in place, and on which wheels or rollers 43 are journaled.

One wheel 43 at both the front and rear is preferably adapted to be positively driven when desired and to this end the adjacent arm or lever 31 has a shaft 44 journaled in bearings 45 thereon. Each shaft 44 at the inner end has a worm wheel or gear 46 enmeshed with a portion 47 of a relatively large worm wheel or gear 48 carried rigidly by a gear wheel 49 journaled on a shaft 50, rigidly fastened to an adjacent part like the axle 16 and casing of the axle 12. Gear wheels 49 are enmeshed with gear wheels 51 keyed to the aforesaid tubular shafts 25 and 26.

In the operation of the device for lifting or lowering incidental to parking or maneuvering within a small space, shaft 20 is driven from the engine through the gearing previously described under suitable clutch control. In order to drive the shaft 24 to accordingly swing the levers 31 to and from lifting position, when the latches 36 are released, a gear shift rod 53 is rocked which slides a gear 54, keyed on and driven by shaft 20 into mesh with a gear 55 keyed on the shaft 24. The intermeshing of the gears 54 and 55 will effect raising movement of the automobile. To effect the lowering movement, gear shift lever 53 is rocked in the opposite direction, moving a gear 56, which is rigid with the gear 54 into mesh with an intermediate gear 57, journaled on a suitable shaft 58, which is enmeshed with a gear 59 on the aforesaid shaft 24.

When the lifting levers are in lifting position, and it is desired to drive the shaft 44 associated with the front lifting levers, gear shift lever 60 is rocked so as to dispose gear 61 slidable on shaft 20 and keyed thereto, into mesh with gear wheel 62, keyed to hollow shaft 25. Rocking of lever 60 in the opposite direction moves a gear wheel 63 rigid with gear wheel 61 into mesh with an intermediate or idler gear 64, journaled on a shaft 65, into mesh with a gear 66 on the hollow shaft 25.

To operate the shaft 44 associated with the rear lifting levers 31, a gear shift lever 67 is rocked in one direction to slide a gear 68, keyed on shaft 20, into mesh with a gear 69, keyed to the hollow shaft 26 while rocking of the same lever 67 in the opposite direction engages a gear 70, rigid with gear 68, with an intermediate or idler gear 71, keyed on a shaft 72, and enmeshed with a gear wheel 73 on the tubular shaft 26.

Various changes may be resorted to provided they fall within the spirit and scope of the invention.

I claim as my invention:

1. In combination with a self-propelled vehicle, means driven by the engine thereof, a pair of lifting arms adjacent the front of the vehicle, a pair of lifting arms adjacent the rear of the vehicle, enmeshed gear teeth at the inner ends of each pair to cause the lifting arms to simultaneously rise and to simultaneously fall, means pivotally mounting each arm between its outer end and said enmeshed gear teeth, mechanism to drive the lifting arms into engagement with the ground at their outer ends through said driven means, including gear segments on an arm of each pair inwardly of the axis of that arm, a shaft extending longitudinally of the vehicle, and gearing on the shaft enmeshed with the segments.

2. In combination with a self-propelled vehicle, means driven by the engine thereof, a pair of lifting arms adjacent the front of the vehicle, a pair of lifting arms adjacent the rear of the vehicle, enmeshed gear teeth at the inner ends of each pair to cause the lifting arms to simultaneously rise and to simultaneously fall, means pivotally mounting each arm between its outer end and said enmeshed gear teeth, mechanism to drive the lifting arms into engagement with the ground at their outer ends through said driven means, including gear segments on an arm of each pair inwardly of the axis of that arm, a shaft extending longitudinally of the vehicle, gearing on the shaft enmeshed with the segments, and wheels at the free ends of the arms.

3. In combination with a self-propelled vehicle, means driven by the engine thereof, a pair of lifting arms adjacent one end of the vehicle, segments at the inner ends of said lifting arms having enmeshed gear teeth to cause the arms to simultaneously rise and to simultaneously fall, mechanism to drive the lifting arms into engagement with the ground at their outer ends through said driven means, and means pivotally mounting each arm between its outer end and said enmeshed gear teeth.

ANDREW BEACHER.